(12) United States Patent
Chemmengath et al.

(10) Patent No.: US 12,406,140 B2
(45) Date of Patent: Sep. 2, 2025

(54) SYSTEM AND METHOD FOR GENERATING CONTRASTIVE EXPLANATIONS FOR TEXT GUIDED BY ATTRIBUTES

(71) Applicant: International Business Machines Corporation, Armonk, NY (US)

(72) Inventors: Saneem Ahmed Chemmengath, Bangalore (IN); Amar Prakash Azad, Bangalore (IN); Ronny Luss, Yorktown Heights, NY (US); Amit Dhurandhar, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 388 days.

(21) Appl. No.: 17/807,160

(22) Filed: Jun. 16, 2022

(65) Prior Publication Data
US 2023/0409832 A1    Dec. 21, 2023

(51) Int. Cl.
*G06F 40/00*    (2020.01)
*G06F 16/35*    (2019.01)
(Continued)

(52) U.S. Cl.
CPC ............ *G06F 40/284* (2020.01); *G06F 16/35* (2019.01); *G06F 40/205* (2020.01); *G06F 40/30* (2020.01); *G06N 3/04* (2013.01)

(58) Field of Classification Search
CPC ...... G06F 40/284; G06F 16/35; G06F 40/205; G06F 40/30; G06F 18/241;
(Continued)

(56) References Cited

U.S. PATENT DOCUMENTS

| 8,264,502 B2 * | 9/2012 | Wang ............... G06V 30/40 |
| | | 715/251 |
| 10,977,729 B2 * | 4/2021 | Kamkar ............ G06Q 40/03 |

(Continued)

FOREIGN PATENT DOCUMENTS

| CN | 111783443 A | * | 10/2020 | ............ G06F 40/284 |
| CN | 111931477 B | * | 1/2021 | ............ G06F 40/194 |
| WO | WO-2022022163 A1 | * | 2/2022 | ............. G06F 16/35 |

OTHER PUBLICATIONS

Molnar, C., Casalicchio, G., & Bischl, B. (Sep. 2020). Interpretable machine learning: a brief history, state-of-the-art and challenges. In Joint European conference on machine learning and knowledge discovery in databases (pp. 417-431). Cham: Springer International Publishing. (Year: 2020).*

(Continued)

*Primary Examiner* — Edgar X Guerra-Erazo
(74) *Attorney, Agent, or Firm* — Rakesh Roy

(57) ABSTRACT

A method, computer program product and system are provided to generate perturbed text is provided. A processor receives a string of text from a user. A processor determines one or more classifications for at least one word in the string of text by a classification model. A processor determines a plurality of perturbations of the at least one word based on the one or more classifications, where the plurality of perturbations do not share the same one or more classifications as the at least one word in the string of text. A processor selects a perturbation of the string of text based on (i) an edit distance between the string of text and the plurality of perturbations, and (ii) a fluency metric for each of the plurality of perturbations. A processor provides the perturbation of the string of text to the user.

17 Claims, 4 Drawing Sheets

(51) Int. Cl.
*G06F 40/205* (2020.01)
*G06F 40/284* (2020.01)
*G06F 40/30* (2020.01)
*G06N 3/04* (2023.01)

(58) Field of Classification Search
CPC .......... G06F 18/2413; G06F 18/24147; G06F 18/2415; G06F 18/24765; G06F 18/285; G06F 18/29; G06F 18/295; G06F 40/242; G06F 40/10; G06F 40/131; G06F 40/157; G06F 40/16; G06F 40/20; G06F 40/211; G06F 40/226; G06F 40/232; G06F 40/237; G06F 40/247; G06F 40/253; G06F 40/268; G06F 40/274; G06F 40/289; G06F 40/295; G06F 40/279; G06F 40/35; G06F 40/56; G06F 40/55; G06F 40/53; G06N 3/04; G06N 3/02; G06N 3/043; G06N 3/044; G06N 3/0442; G06N 3/0455; G06N 3/045; G06N 3/0464; G06N 3/047; G06N 3/0475; G06N 3/048; G06N 3/049; G06N 3/0499; G06N 3/08; G06N 3/084; G06N 3/088; G06N 3/0895; G06N 3/09; G06N 3/091; G06N 3/092; G06N 3/094; G06N 3/096; G06N 3/098; G06N 3/0985; G06N 5/01; G06N 5/00; G06N 5/042; G06N 5/04; G06N 5/048; G06N 5/046; G06N 5/045; G06N 5/043; G06N 5/047; G06N 7/01; G06N 7/00; G06N 7/02; G06N 7/023; G06N 7/026; G06N 20/00; G06N 20/10; G06N 20/20; G10L 15/02; G10L 15/005; G10L 2015/027; G10L 2015/025; G10L 2015/022; G10L 15/05; G10L 15/04; G10L 15/063; G10L 2015/0631; G10L 2015/0633; G10L 2015/0635; G10L 2015/0636; G10L 15/08; G10L 2015/085; G10L 2015/086; G10L 2015/088; G10L 15/10; G10L 15/16; G10L 15/14; G10L 15/142; G10L 15/148; G10L 15/1807; G10L 15/18; G10L 15/1815; G10L 15/1822; G10L 15/183; G10L 15/187; G10L 15/19; G10L 15/193; G10L 15/197; G10L 17/08; G10L 17/18; G10L 17/24; G10L 17/22
See application file for complete search history.

(56) References Cited

U.S. PATENT DOCUMENTS

| | | | | |
|---|---|---|---|---|
| 11,222,242 B2* | 1/2022 | Luss | ...................... | G06V 10/82 |
| 11,450,225 B1* | 9/2022 | Kilari | ...................... | G06F 40/30 |
| 11,507,787 B2* | 11/2022 | Dhurandhar | ............ | G06F 18/24 |
| 11,606,389 B2* | 3/2023 | Chen | .................. | H04L 63/1466 |
| 11,663,404 B2* | 5/2023 | Wang | ...................... | G06F 40/30 704/9 |
| 11,669,687 B1* | 6/2023 | Joshi | ...................... | G06F 40/30 704/9 |
| 11,720,751 B2* | 8/2023 | Zohrevand | ............. | G06N 5/045 704/9 |
| 11,755,948 B2* | 9/2023 | Kapishnikov | ............ | G06N 5/04 706/20 |
| 2020/0193243 A1 | 6/2020 | Dhurandhar | | |
| 2020/0402658 A1 | 12/2020 | Tomsett | | |
| 2021/0067549 A1* | 3/2021 | Chen | ...................... | G06N 3/084 |
| 2021/0192382 A1* | 6/2021 | Kapishnikov | ............ | G06N 5/04 |
| 2022/0129794 A1* | 4/2022 | McGrath | ............. | G06F 16/2379 |
| 2023/0016365 A1* | 1/2023 | Qiu | ......................... | G06F 40/30 |
| 2023/0120965 A1* | 4/2023 | Kilari | ...................... | G06F 40/30 |
| 2023/0376700 A1* | 11/2023 | Bista | ...................... | H04L 51/02 |

OTHER PUBLICATIONS

W. Zhang, Q. Chen and Y. Chen, "Deep Learning Based Robust Text Classification Method via Virtual Adversarial Training," in IEEE Access, vol. 8, pp. 61174-61182, 2020. (Year: 2020).*

W. Shi, M. Song and Y. Wang, "Perturbation-enhanced-based RoBERTa combined with BiLSTM model for Text classification," ICETIS 2022; 7th International Conference on Electronic Technology and Information Science, Harbin, China, 2022, pp. 1-5. (Year: 2022).*

Chemmengath et al., "Let the CAT out of the bag: Contrastive Attributed explanations for Text", Grace Period Disclosure, arXiv:2109.07983v1 [cs.CL] Sep. 16, 2021, 15 pages.

Jacovi et al., "Contrastive Explanations for Model Interpretability", arXiv:2103.01378v3 [cs.CL] Sep. 14, 2021, 15 pages.

Luss et al., "Leveraging Latent Features for Local Explanations", Research Track Paper, KDD '21, Aug. 14-18, 2021, Virtual Event, Singapore, 11 pages.

Madaan et al., "Generate Your Counterfactuals: Towards Controlled Counterfactual Generation for Text", The Thirty-Fifth AAAI Conference on Artificial Intelligence (AAAI-21), 9 pages.

Paranjape et al., "Prompting Contrastive Explanations for Commonsense Reasoning Tasks", Findings of the Association for Computational Linguistics: ACL-IJCNLP 2021, Aug. 1-6, 2021. © 2021 Association for Computational Linguistics, 14 pages.

Ross et al. "Explaining NLP Models via Minimal Contrastive Editing (MICE)", Findings of the Association for Computational Linguistics: ACL-IJCNLP 2021, Aug. 1-6, 2021, © 2021 Association for Computational Linguistics, 13 pages.

Yin et al., "Interpreting Language Models with Contrastive Explanations", arXiv:2202.10419v1 [cs.CL] Feb. 21, 2022, 13 pages.

* cited by examiner

SYSTEM AND METHOD FOR GENERATING CONTRASTIVE EXPLANATIONS FOR TEXT GUIDED BY ATTRIBUTES

STATEMENT REGARDING PRIOR DISCLOSURES BY THE INVENTOR OR A JOINT INVENTOR (IF APPLICABLE)

The following disclosure(s) are submitted under 35 U.S.C. 102(b)(1)(A): DISCLOSURE(S): CHEMMENGATH et al., "Let the CAT out of the bag: Contrastive Attributed explanations for Text", arXiv:2109.07983v1 [cs.CL] 16 Sep. 2021, 15 pages.

BACKGROUND OF THE INVENTION

The present invention relates generally to the field of natural language processing, and more particularly to altering text based on attribute classifications while ensuring semantical structure.

Perturbation is the act of altering values in a data set. For strings of text, a sentence that changes a word would be a perturbation of the original sting of text. In natural language processing and machine learning, a classification model classifies the string of text based on the subject matter and domains mentioned in the string. Other classification models may capture sentiment and other opinion classifications such as bias as well.

SUMMARY

Embodiments of the present invention provide a method, computer program product and system to generate perturbed text. A processor receives a string of text from a user. A processor determines one or more classifications for at least one word in the string of text by a classification model. A processor determines a plurality of perturbations of the at least one word based on the one or more classifications, where the plurality of perturbations do not share the same one or more classifications as the at least one word in the string of text. A processor selects a perturbation of the string of text based on (i) an edit distance between the string of text and the plurality of perturbations, and (ii) a fluency metric for each of the plurality of perturbations. A processor provides the perturbation of the string of text to the user.

DETAILED DESCRIPTION

Figure 1:
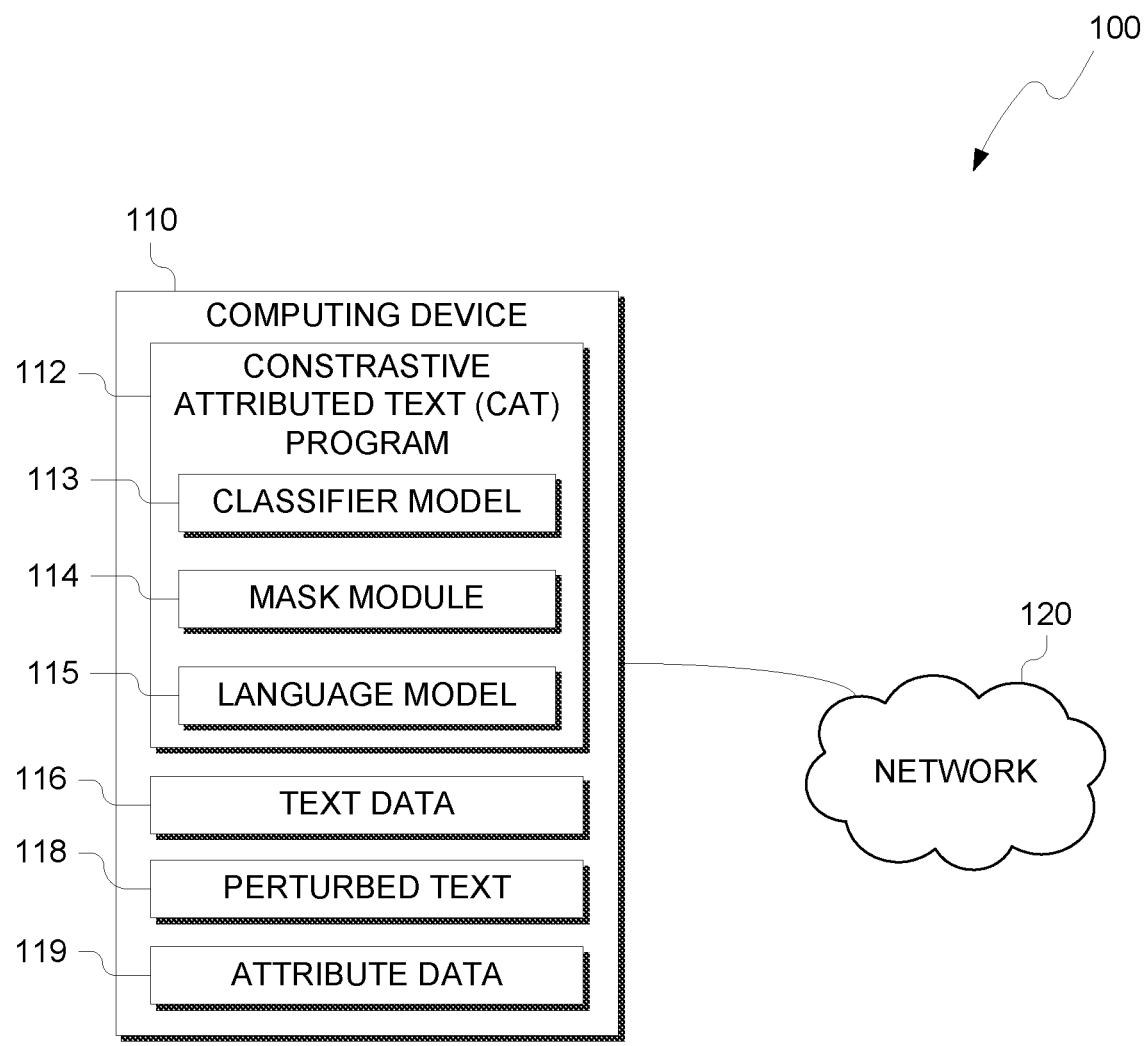
FIG. 1 is a functional block diagram illustrating a computing environment, in accordance with an exemplary embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating computing environment, generally designated 100, in accordance with one embodiment of the present invention. Computing environment 100 includes computing device 110 connected to network 120. Computing device 110 includes contrastive attribute text (CAT) program 112, classifier model 113, mask module 114, language model 115, text data 116, perturbed text 118 and attribute data 119.

In various embodiments of the present invention, computing device 110 is a computing device that can be a standalone device, a server, a laptop computer, a tablet computer, a netbook computer, a personal computer (PC), or a desktop computer. In another embodiment, computing device 110 represents a computing system utilizing clustered computers and components to act as a single pool of seamless resources. In general, computing device 110 can be any computing device or a combination of devices with access to classifier model 113, mask module 114, language model 115, text data 116, perturbed text 118 and attribute data 119 and is capable of executing CAT program 112. Computing device 110 may include internal and external hardware components, as depicted and described in further detail with respect to FIG. 4.

In this exemplary embodiment, CAT program 112, classifier model 113, mask module 114, language model 115, text data 116, perturbed text 118 and attribute data 119 are stored on computing device 110. However, in other embodiments, program 112, classifier model 113, mask module 114, language model 115, text data 116, perturbed text 118 and attribute data 119 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between other devices (not shown) connected to network 120, in accordance with a desired embodiment of the present invention.

In various embodiments, CAT program 112 receives string of text from a user as text data 116. As discussed herein, CAT program 112 generates a contrastive or perturbed string of text that alters a portion of the text, perturbed text 118, while maintaining some of the original string of text received from the user. For example, CAT program 112 perturbs the original sentence of "Global server sales on the rise" to create a contrasting or different sentence of "Global ticket sales on the rise" as well as attribute data 119 that were added to and deleted from the sentence when generating the perturbation. For example, in the sentence above, the attributes Travel and Sale were added and the attribute Computer was removed. Text data 116 is typically received as a natural language sentence. While the following will be discussed in regard to generating perturbed sentences, one of ordinary skill in the art will appreciate that text data 116 can be of any length and could be applied to larger blocks of text, such as paragraphs.

In various embodiments, CAT program 112 determines one or more classifiers for text data 116. The one or more classifiers identify subjects, domains and other components of the sentence in text data 116. Classifier model 113 includes a trained machine learning model for classifying components of text data 116. In some scenarios, classifier model 113 includes a Naive Bayes Classifier. A Naive Bayes Classifier takes each word, or a string of words, and determines a probability that the word or string is of a group and selecting the group that has the highest probability. For example, the word "game" would have a higher likelihood of belong to the classification of "Sports" than that of "Business". One of ordinary skill in the art will appreciate that any classifier model to determine classification of words or stems in text data 116 without deviating from the invention. Example classifier models include, but are not limited to, decision trees, nearest neighbor cluster analysis, or classifier neural networks.

In various embodiments, mask module 114 of CAT program 112 inserts one or more masks for any important words in text data 116. Each mask indicates potential words for perturbation that can be altered when generating perturbed text 118. Mask module 114 determines important words based on a feature attribution model, which can be one of various embodiments. One example of a feature attribution model is integrated gradients. Integrated Gradient is a deep neural network model that measures the importance of each component of a data set, in this scenario the importance of words in a sentence. In natural language processing, an integrated gradient model assigns an attribution value to each word, which reflects how much contribution a word makes to a classification, such as by classifier model 113. The integrated gradient model starts with a baseline attribution value for each word. Then for numerous iterations, the integrated gradient model modifies the baseline attribution values for each word until an influence for each word in the sentence is determined. This influence is a "gradient" showing informational flow or importance of a word over others in the sentence. One of ordinary skill in the art will appreciate that any methodology could be used to determine important words in text data 116 including, but not limited to, Parts-of-Speech (POS) tagging, semantic networks and the like.

In various embodiments, each important word is associated with an attribute of text data 116 and with a variety of candidate perturbations that are evaluated on both the difference to the original text but also for fluency to maintain grammatical and semantical structure. In various embodiments, CAT program 112 generates various candidate perturbations of text data 116. For the masked important words, CAT program 112 identifies the attribute assigned to each masked word and generates various candidate perturbations by changing the important words to words with different attributes, which is recorded as attribute data 119. For example, if an important word "PC" is assigned a "technology" attribute, CAT program 112 generates candidate perturbations that change "PC" to words not belonging to the "technology" attribute, such as words belonging to "cooking" or "finance". Additionally, attribute data 119 includes the removed attributes caused by the perturbation. In the previous example, a removal of the "PC" word would be indicated as removal of the technology attribute by "-technology" and addition of the cooking attribute by "+cooking".

In various embodiments, CAT program 112 determines an edit distance between the original text data 116 and each of the candidate perturbations. The edit distance is a numerical measure of the amount of edits or changes between text data 116 and the candidate perturbations. In some scenarios, edit distance is based on a letter-by-letter comparison of text. For example, the original text "Jack ran down the hill" that has a perturbed candidate that replaces "hill" to "Jack ran down the aisle" would have an edit distance of four (4) units since both words share the letter "i" in the same place, but differ for the four remaining letter of "aisle". In other scenarios, edit distance is based on word-by word changes, where in the previous example the edit distance is one (1) unit since only one word was changed.

In various embodiments, language model 115 is a pretrained neural network for masked-language modeling (MLM). Language model 115 includes a Bidirectional Encoder Representations from Transformers, or BERT model. A BERT transformer model digests sequential text from text data 116 (i.e., sentences or paragraphs) and generates word embeddings or phrase embeddings (e.g., more than one word of the document is represented by the embedding) representing the topics or concepts discussed in the text. The MLM-BERT language model 115 model masks or removes important words from the candidate perturbations and then predicts the most likely word for the masked word. In each evaluation of text data, an important word that is being perturbed is removed from text data 116. The MLM-BERT model then determines a loss function between the predicted word by the MLM-BERT and then processes the candidate perturbations with the BERT model loss score without masking.

In various embodiments, based on the edit distance and loss scores between text data 116 and the candidate perturbations, CAT program 112 selects the candidate perturbation which maximizes the following objective function:

$$\max(x' \in X) \left\{ \|\vartheta(x') - \vartheta(x')\|_\infty - \beta \sum_i |\vartheta_i(x') - \vartheta_i(x)| > \tau + \right.$$
$$\left. \lambda * \max\left(j \in \frac{Y}{y}\right) \{[f(x')]_j - [f(x)]_y\} + n * p_{LM}(x') - v * d_{Lev}(x', x) \right\}$$ [E.1]

In E.1 above, given an input text $x \in X$, and a text classification model f( ) which predicts $y=f(x) \in Y$, to create a perturbed instance x' such that the predictions $f(x) \neq f(x')$ and x' is minimally different from x. CAT program 112 uses a set of m attribute classifiers $\vartheta_i: X \to \mathbb{R}$, $i \in \{1 \ldots m\}$, which produce scores indicative of presence (higher scores) or absence (lower scores) of corresponding attributes in the text. If attribute i is added to the perturbed sentence if 119 $|\vartheta_i(x') - \vartheta_i(x)| > \tau$ and removed when $|\vartheta_i(x') - \vartheta_i(x)| > -\tau$, for a fixed $\tau > 0$. Edit distance between original and perturbed instance is determined via a word level Levenstien $d_{Lev}(x', x)$, which is the minimum number of deletions, substitutions, or insertions required to transform x to x' is used to keep the perturbed instance close to the original. The fluency of a generated sentence x' is quantified by the likelihood of sentence x' as measured by the language model used for generation; the likelihood is denoted by $p_{LM}(x')$. For a predicate Φ, CAT program 112 denotes $1_\Phi$, the indicator of Φ, which takes the value 1 if Φ is true and 0 otherwise. $\vartheta(x)$ is a vector such that $[\vartheta(x)]_i = \vartheta_i(x)$, β, λ, n, v>0 are hyperparameters that trade-off different aspects, and $\|*\|_\infty$ is the $1_\infty$ norm. The first term in the objective function encourages to pick an x0 where at least one attribute is either added/removed from x. The second term minimizes the number of such attributes for ease of interpretation. The third term is the contrastive score, which encourages the perturbed instance to be predicted different than the original instance. Fourth and fifth terms ensure that the contrast is fluent and close to the original instance, respectively.

In various embodiments, CAT program 112 selects the candidate perturbation which maximizes E.1. Once the candidate perturbation is selected, the perturbed text is provided to the user as perturbed text 118. In various embodiments, CAT program 112 provides, to the classifier model 113, attribute data 119 regarding the attributes that were added and removed from input text data 116 to the selected perturbed text 118. In such scenarios, CAT program 112 can be used to detect bias of classifier model 113. Based on the difference in attribute data 119, and therefore changes in input text data 116, changes in classification of the classifier model 113 can be observed. The following table provides a few examples where input text data 116 (with original removed text indicated as strikethrough) has been perturbed (i.e., perturbed text 118, shown as underlines), with changes to attribute data 119 (removed attributes and added attributes) as well as initial and perturbed classifications of input text data 116 and perturbed text 118, respectively.

| Input text data (Strikethrough) & Perturbed text (Underline) | Attribute Changes | Input Classifier | Perturbed Classifier |
|---|---|---|---|
| Torrent Owner Cheers ~~File~~ Salary-Swapping Decision | +forsale, +baseball, +hockey, −arts, −windows, −cryptography | sci-tech | sports |
| New Human Species ~~Discovered~~ influenza | +medicine, −cryptography | sci-tech | world |
| Pace of U.S. ~~Factory~~ population Growth Climbs in December | +politics, −money, −travel | business | sci-tech |
| It may take 146 years for Genovia to wipe out ~~corruption~~ funds from ~~its~~ bank system going by ~~the~~ latest report | +money, −politics | world | business |

The above table shows the results of CAT program 112 when generating perturbed text 118 for five headlines found in news articles. In the first example, the classifier model 113 determines that the headline likely directed towards "sci-tech" because if the headline was more related to topics such as things for sale, baseball, hockey, and less about computer-related topics, it would have been predicted sports, which is achieved in the contrast by replacing "File" with "Salary". In this example, classifier model 113 considers "Torrent" a sports team because of the change. The second example illustrate how the attribute changes relate to the perturbed classifier. In this example, CAT program 112 identifies what topics the classifier model 113 finds most relevant to the prediction, as opposed to only knowing the single word and needing to figure out why that caused the change. In the third example, adding politics and removing money leads to changing the input from business to sci-tech as "factory growth" has more relationship to money while "population growth" is related to politics. In the fourth example, CAT program 112 identifies the opposite, as adding money and removing politics changes the input from world to business. In this example, CAT program 112 illustrates that, for longer text, single perturbations are often insufficient to flip the label and multiple changes are needed. In the above examples, CAT program 112 reevaluates perturbed text 118 with classifier model 113. Given a different classification (i.e., Input Classifier is different from Perturbed Classifier in the above table), then CAT program 112 identifies changes in attribute data 119 to identify any biases of classifier model 113.

Figure 2:
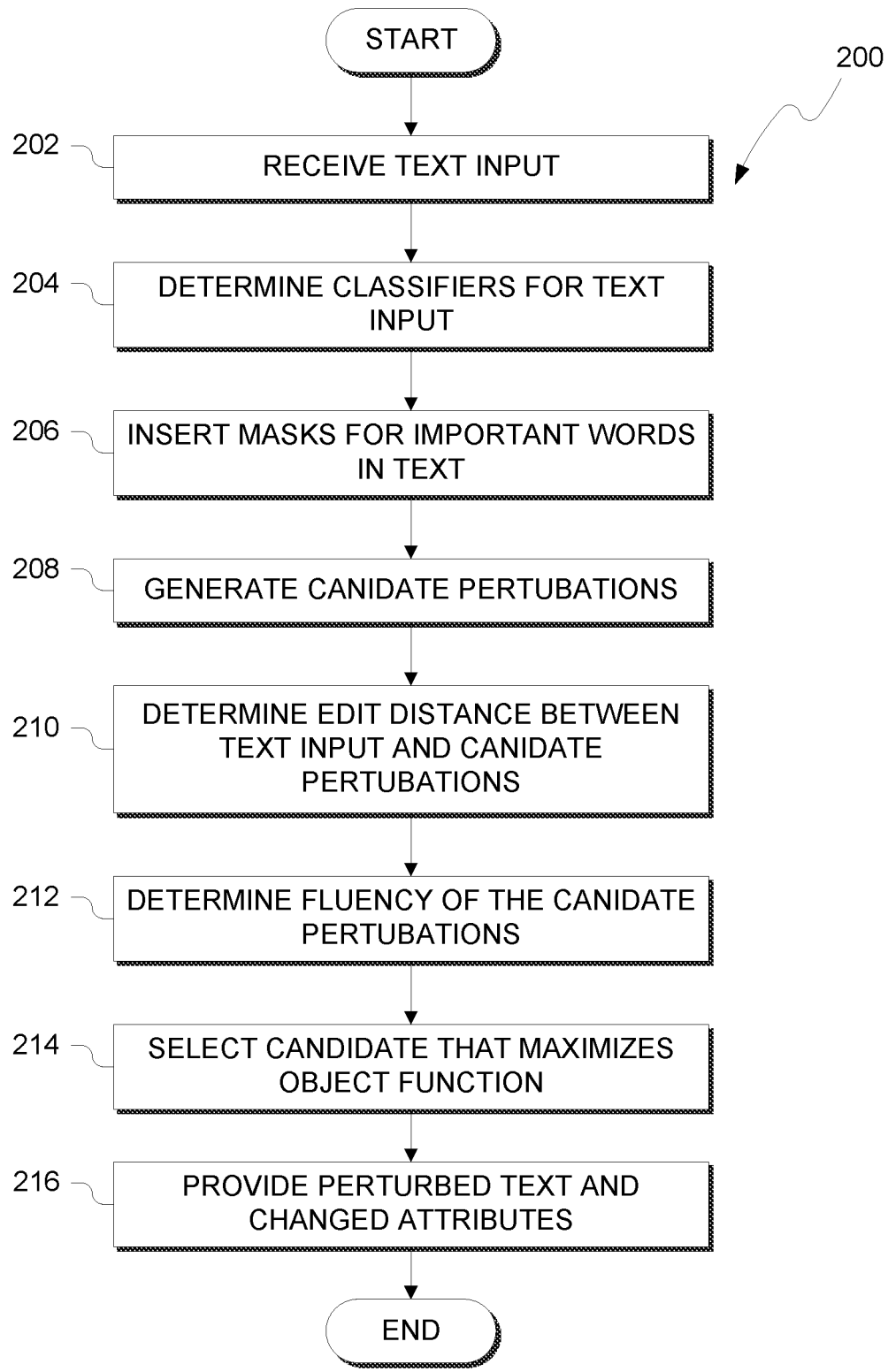
FIG. 2 illustrates operational processes of a contrastive attribute text (CAT) program, on a computing device within the environment of FIG. 1, in accordance with an exemplary embodiment of the present invention.

FIG. 2 illustrates operational processes, generally designated 200, of contrastive attribute text (CAT) program 112, on computing device 110 within the environment of FIG. 1. In process 202, CAT program 112 receives text input from a user as text data 116. In some scenarios, CAT program 112 is provided a sentence to perturb. In other scenarios, text data 116 includes more than one sentence to perturb. In such scenarios, CAT program 112 repeats processes 204-216 for each sentence in text data. In further scenarios, CAT program 112 perturbs larger blocks of text, such as a paragraph or an entire article of text.

In process 204, CAT program 112 determines classifiers for text data 116. Classifier model 113 includes a trained machine learning model for classifying components of text data 116. For each word, a classification regarding the domain or features of the text is determined. For example, CAT program 112 determines a subject matter domain for each subject or object referenced in text data 116. In process 206, CAT program 112 inserts masks for important words. Important words are identified via an integrated gradients model applied to each word of text data 116.

In process 208, CAT program 112 generates candidate perturbations from input text 116. Candidate perturbations change one or more important words of text data. Based on the classification of the important words, CAT program 112 identifies words that do not possess attributes associated with the classification. For example, if an important word is classified as related to "Sports" then candidate perturbations generated by CAT program 112 are any words that do not possess attributes or can be classified as related to "Sports".

In process 210, CAT program 112 determines the edit distance between each of the candidate perturbations to text data 116. Edit distance correlates to the number of changes made to text data 116. In some instances, CAT program 112 determines edit distance based on the number of words that have been changed. In other instances, CAT program 112 determines edit distance based on the number of characters that have been changed. In process 212, CAT program 112 determines the fluency of the candidate perturbations. CAT program 112 deploys language model 115 which includes a MLM-BERT model that utilizes a mask-based approach that removes words from text and predicts the missing word. The perturbation that is closest to the prediction is determined to be more fluent.

In process 214, CAT program 112 selects the candidate that maximizes the objective function E.1. As stated in processes 210 and 212, the closest candidate in terms of edit distance and fluency which maximizes the value of E.1 is selected as perturbed text 118. In process 216, CAT program 112 provides the user with perturbed text 118. Additionally, CAT program 112 provides attribute data 119 which indicates the attributes that were removed from text data 116 and added to perturbed text 118.

Figure 3:
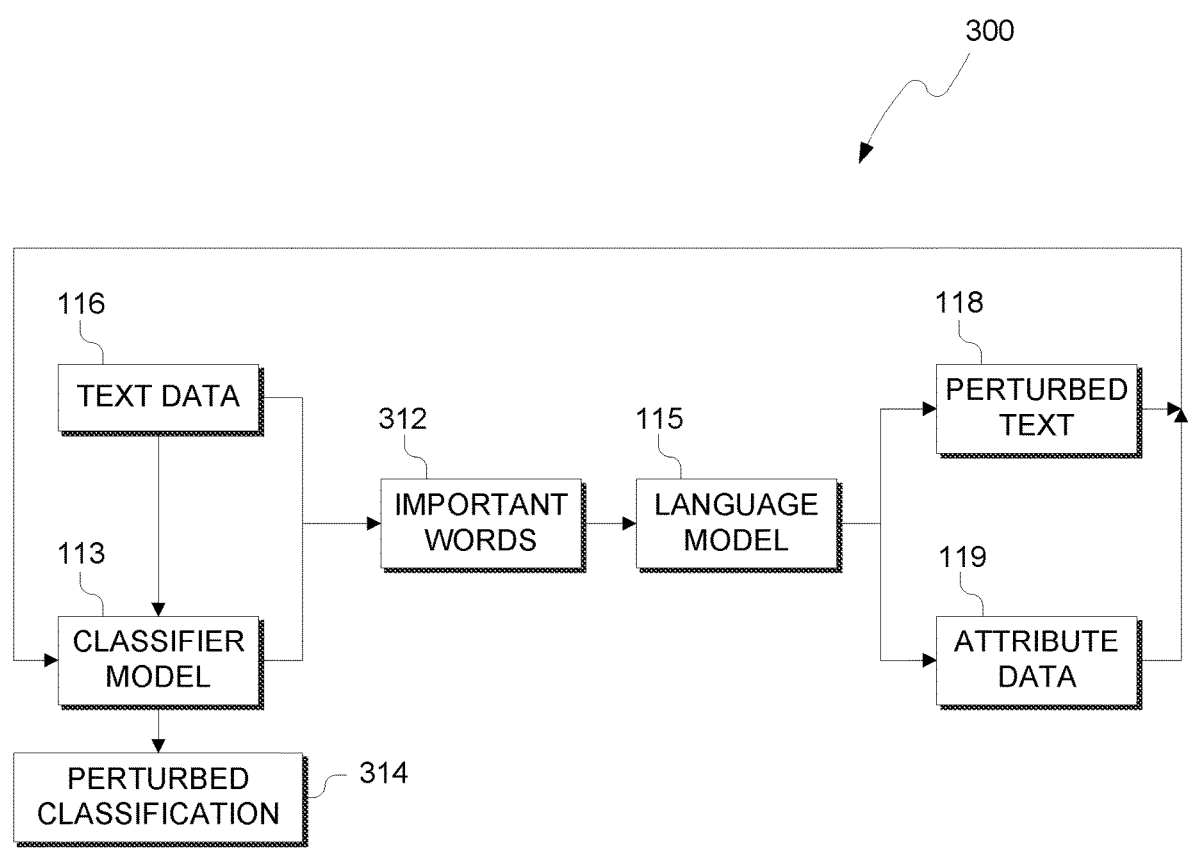
FIG. 3 depicts a block diagram of the system architecture utilized by a CAT program.

FIG. 3 depicts a block diagram of the system architecture 300 utilized by a CAT program 112. As discussed herein, text data 116 is provided to CAT program 112 as well as a classifier model 113. Via an integrated gradients neural network, CAT program 112 identifies important words 312 in text data 116. For at least one important word in important words 312, CAT program 112 perturbs or changes the word to generate one or more candidate perturbations. Based on the evaluation of language model 115, the perturbation that is most fluent is selected as perturbed text 118. Any changes the text data are recorded based on the attributes of text data 116 that are removed or added to perturbed text 118 as perturbed classification 314.

In various embodiments, CAT program 112 reclassifies perturbed text 118 to evaluate classifier model 113 for any bias present in the model. If classifier model 113 generates a classifier that is determined to show bias, the CAT program 112 monitors the changes in classification caused by perturbed text 118. If the addition or removal of an attribute indicates bias by classifier model 113, then CAT program 112 identifies the words classified with the attribute or attributes that indicated the bias and provides the results for review to retrain or update classifier model 113.

Figure 4:
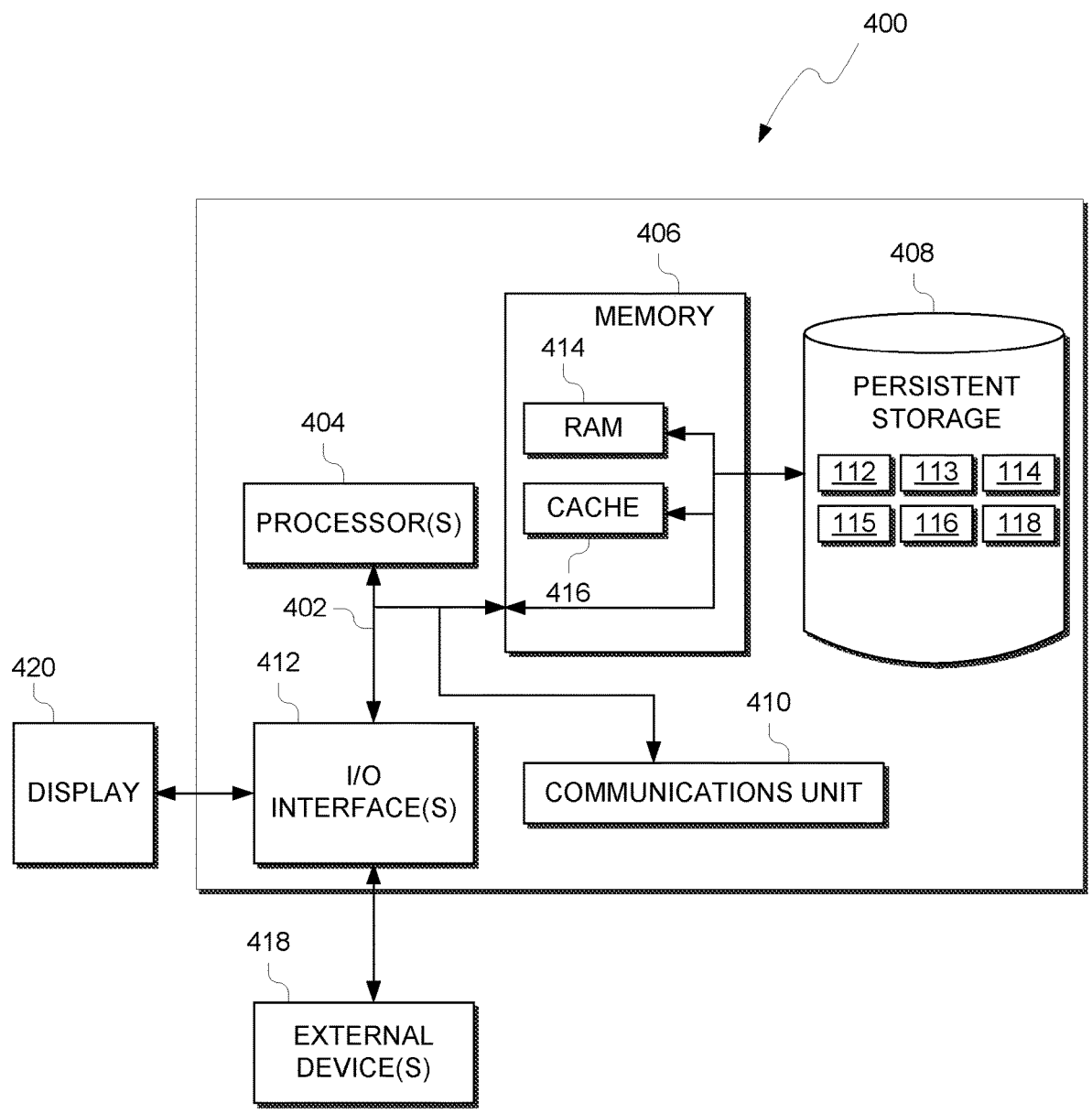
FIG. 4 depicts a block diagram of components of the computing device executing a CAT program, in accordance with an exemplary embodiment of the present invention.

FIG. 4 depicts a block diagram, 400, of components of computing device 110, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 110 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

CAT program 112, classifier model 113, mask module 114, language model 115, text data 116, perturbed text 118 and attribute data 119 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of network 120. In these examples, communications unit 410 includes one or more network interface cards. Communications unit 410 may provide communications through the use of either or both physical and wireless communications links. CAT program 112, classifier model 113, mask module 114, language model 115, text data 116, perturbed text 118 and attribute data 119 may be downloaded to persistent storage 408 through communications unit 410.

I/O interface(s) 412 allows for input and output of data with other devices that may be connected to computing device 110. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., CAT program 112, classifier model 113, mask module 114, language model 115, text data 116, perturbed text 118 and attribute data 119, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A computer-implemented method comprising:
    receiving a string of text from a user;
    determining one or more classifications for at least one word in the string of text by a classification model;
    determining a plurality of perturbations of the at least one word in the string of text such that the plurality of perturbations do not share a same classification with the one or more classifications of the at least one word in the string of text;
    selecting, from the plurality of perturbations, a perturbation of the string of text that includes a respective perturbed classification that is different from the one or more classifications of the at least one word in the string of text based on (i) an edit distance between the string of text and the plurality of perturbations, and (ii) a fluency metric for each of the plurality of perturbations; and
    providing, to the user, the perturbation of the string of text that includes the respective perturbed classification that is different from the one or more classifications of the at least one word in the string of text, wherein the providing identifies one or more attribute changes between the string of text and the perturbation of the string of text corresponding to the respective perturbed classification.

2. The computer-implemented method of claim 1, wherein the perturbation of the string of text and the one or more attribute changes are provided to the classification model for reclassification of the perturbation.

3. The computer-implemented method of claim 2, the method further comprising:
    determining, by the one or more processors, one or more perturbed classifications for the perturbation of the string of text by the classification model; and
    identifying, by the one or more processors, bias in the classification model based on the one or more perturbed classifications.

4. The computer-implemented method of claim 1, wherein the fluency metric for each of the plurality of perturbations is based on output from a masked-language modeling bidirectional encoder representations from transformers (MLM-BERT) Language model.

5. The computer-implemented method of claim 1, wherein at least one word in the plurality of perturbations is selected based on an integrated gradient neural network model of the string of text.

6. The computer-implemented method of claim 1, wherein the edit distance indicates a number of words changed from the string of text to a perturbation of the string of text of the plurality of perturbations.

7. A computer program product comprising:
one or more computer-readable storage media and program instructions stored on the one or more computer-readable storage media, the program instructions comprising:
program instructions to receive a string of text from a user;
program instructions to determine one or more classifications for at least one word in the string of text by a classification model;
program instructions to determine a plurality of perturbations of the at least one word in the string of text such that the plurality of perturbations do not share a same classification with the one or more classifications of the at least one word in the string of text;
program instructions to select, from the plurality of perturbations, a perturbation of the string of text that includes a respective perturbed classification that is different from the one or more classifications of the at least one word in the string of text based on (i) an edit distance between the string of text and the plurality of perturbations, and (ii) a fluency metric for each of the plurality of perturbations; and
program instructions to provide, to the user, the perturbation of the string of text that includes the respective perturbed classification that is different from the one or more classifications of the at least one word in the string of text, wherein the program instructions to provide identifies one or more attribute changes between the string of text and the perturbation of the string of text corresponding to the respective perturbed classification.

8. The computer program product of claim 7, wherein the perturbation of the string of text and the one or more attribute changes are provided to the classification model for reclassification of the perturbation.

9. The computer program product of claim 8, the program instructions further comprising:
program instructions to determine one or more perturbed classifications for the perturbation of the string of text by the classification model; and
program instructions to identify bias in the classification model based on the one or more perturbed classifications.

10. The computer program product of claim 7, wherein the fluency metric for each of the plurality of perturbations is based on output from a masked-language modeling bidirectional encoder representations from transformers (MLM-BERT) Language model.

11. The computer program product of claim 7, wherein at least one word in the plurality of perturbations is selected based on an integrated gradient neural network model of the string of text.

12. The computer program product of claim 7, wherein the edit distance indicates a number of words changed from the string of text to a perturbation of the string of text of the plurality of perturbations.

13. A computer system comprising:
one or more computer processors;
one or more computer readable storage media; and
program instructions stored on the computer readable storage media for execution by at least one of the one or more processors, the program instructions comprising:
program instructions to receive a string of text from a user;
program instructions to determine one or more classifications for at least one word in the string of text by a classification model;
program instructions to determine a plurality of perturbations of the at least one word in the string of text such that the plurality of perturbations do not share a same classification with the one or more classifications of the at least one word in the string of text;
program instructions to select, from the plurality of perturbations, a perturbation of the string of text that includes a respective perturbed classification that is different from the one or more classifications of the at least one word in the string of text based on (i) an edit distance between the string of text and the plurality of perturbations, and (ii) a fluency metric for each of the plurality of perturbations; and
program instructions to provide, to the user, the perturbation of the string of text that includes the respective perturbed classification that is different from the one or more classifications of the at least one word in the string of text, wherein the program instructions to provide identifies one or more attribute changes between the string of text and the perturbation of the string of text corresponding to the respective perturbed classification.

14. The computer system of claim 13, wherein the perturbation of the string of text and the one or more attribute changes are provided to the classification model for reclassification of the perturbation.

15. The computer system of claim 14, the program instructions further comprising:
program instructions to determine one or more perturbed classifications for the perturbation of the string of text by the classification model; and
program instructions to identify bias in the classification model based on the one or more perturbed classifications.

16. The computer system of claim 13, wherein the fluency metric for each of the plurality of perturbations is based on output from a masked-language modeling bidirectional encoder representations from transformers (MLM-BERT) Language model.

17. The computer system of claim 13, wherein at least one word in the plurality of perturbations is selected based on an integrated gradient neural network model of the string of text.

* * * * *